United States Patent
Inaba

(10) Patent No.: US 10,769,473 B2
(45) Date of Patent: Sep. 8, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masaki Inaba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 16/100,915

(22) Filed: Aug. 10, 2018

(65) Prior Publication Data

US 2019/0057274 A1    Feb. 21, 2019

(30) Foreign Application Priority Data

Aug. 17, 2017 (JP) .................. 2017-157618

(51) Int. Cl.
| | |
|---|---|
| *G06K 9/32* | (2006.01) |
| *G06K 9/66* | (2006.01) |
| *G06T 7/73* | (2017.01) |
| *G06N 20/00* | (2019.01) |
| *G06K 9/62* | (2006.01) |
| *G06N 3/08* | (2006.01) |
| *G06N 3/04* | (2006.01) |

(52) U.S. Cl.
CPC ......... *G06K 9/3241* (2013.01); *G06K 9/6256* (2013.01); *G06K 9/6262* (2013.01); *G06K 9/6273* (2013.01); *G06K 9/66* (2013.01); *G06N 3/0454* (2013.01); *G06N 3/084* (2013.01); *G06N 20/00* (2019.01); *G06T 7/73* (2017.01)

(58) Field of Classification Search
CPC .. G06K 9/3241; G06K 9/6256; G06K 9/6262; G06K 9/6273; G06K 9/66; G06T 7/73; G06N 20/00; G06N 3/0454; G06N 3/084
See application file for complete search history.

(56) References Cited

U.S. PATENT DOCUMENTS

| | | | | |
|---|---|---|---|---|
| 2012/0213426 | A1* | 8/2012 | Fei-Fei ............... | G06K 9/6267 382/159 |
| 2013/0016877 | A1* | 1/2013 | Feris .................. | G06K 9/00771 382/103 |
| 2014/0133743 | A1* | 5/2014 | Cheon ................. | G06K 9/6227 382/159 |
| 2016/0071264 | A1* | 3/2016 | Agam .................. | G06K 9/3241 382/128 |
| 2017/0011281 | A1* | 1/2017 | Dijkman .............. | G06K 9/66 |
| 2017/0083791 | A1* | 3/2017 | Shiratani ............. | G06K 9/00624 |

(Continued)

FOREIGN PATENT DOCUMENTS

| | | |
|---|---|---|
| JP | 2014-022837 | 2/2014 |
| JP | 5953151 | 7/2016 |

*Primary Examiner* — David F Dunphy
(74) *Attorney, Agent, or Firm* — Venable LLP

(57) ABSTRACT

A plurality of recognition positions each recognized by a recognizer as a position of a target object on an input image are acquired. At least one representative position is obtained by performing clustering for the plurality of recognition positions. The representative position is edited in accordance with an editing instruction from a user for the representative position. The input image and the representative position are saved as learning data to be used for learning of the recognizer.

20 Claims, 11 Drawing Sheets

(56) References Cited

U.S. PATENT DOCUMENTS

2018/0165554 A1\*  6/2018  Zhang .................. G06K 9/6256
2018/0174001 A1\*  6/2018  Kang ..................... G06K 9/622
2018/0349388 A1\* 12/2018  Skiles .................. G06F 16/355

\* cited by examiner

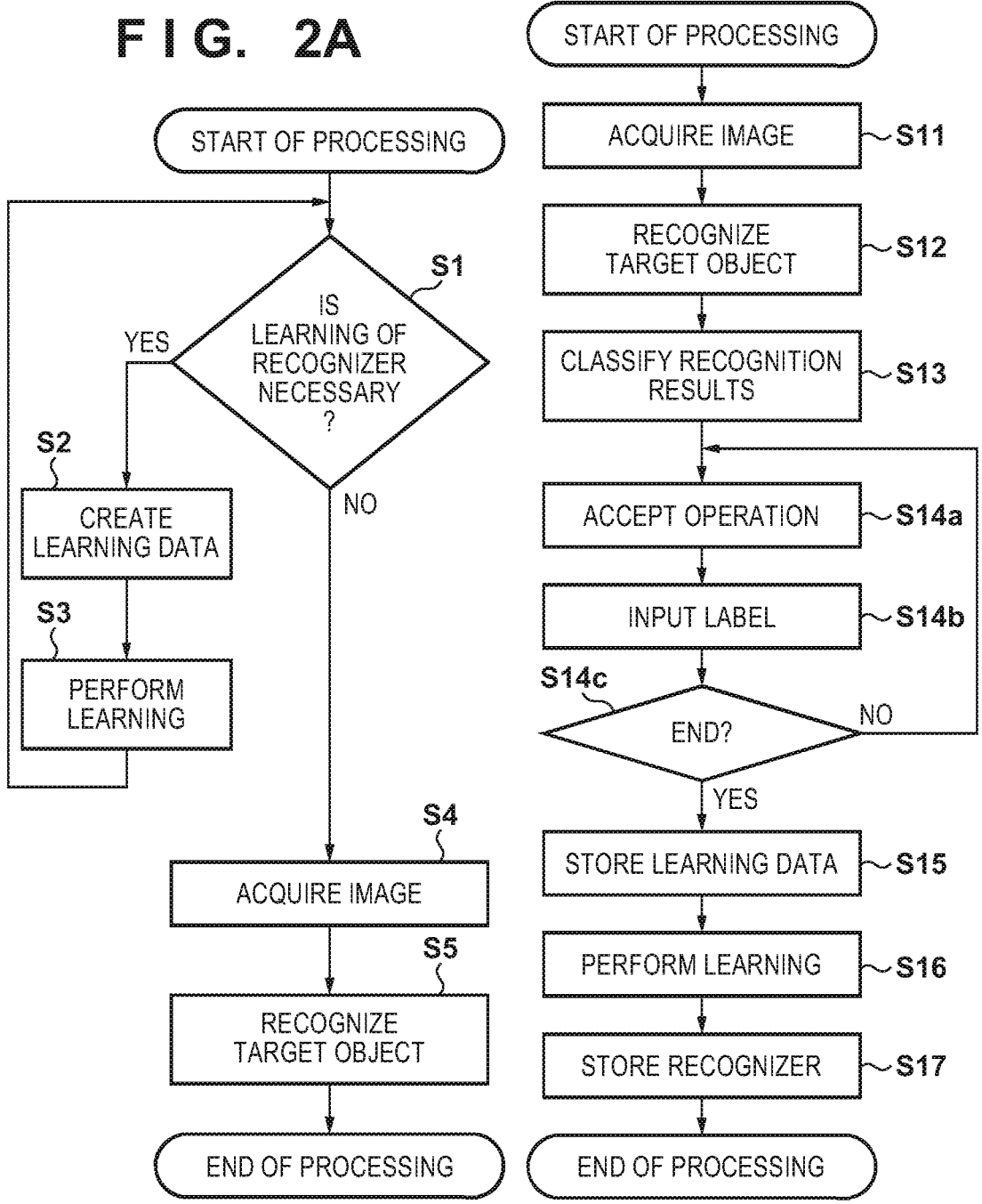

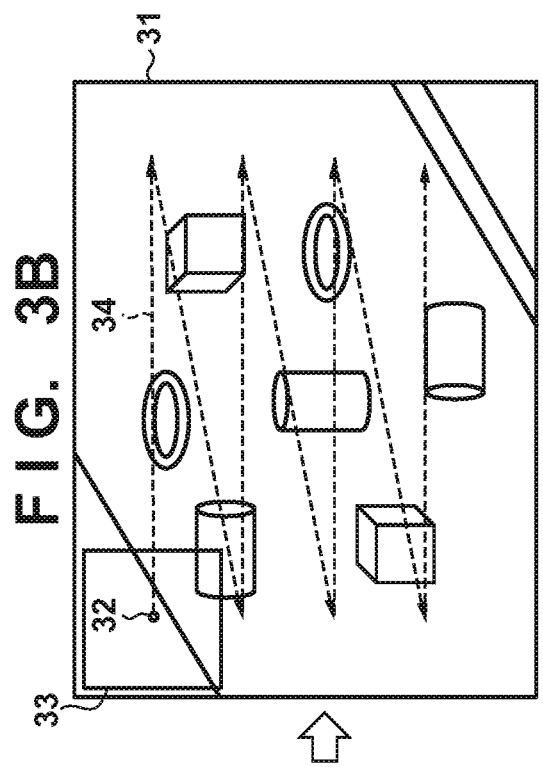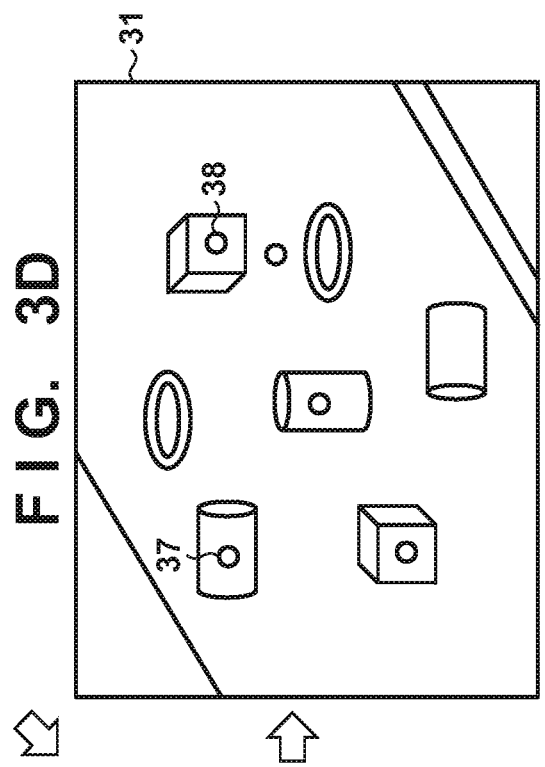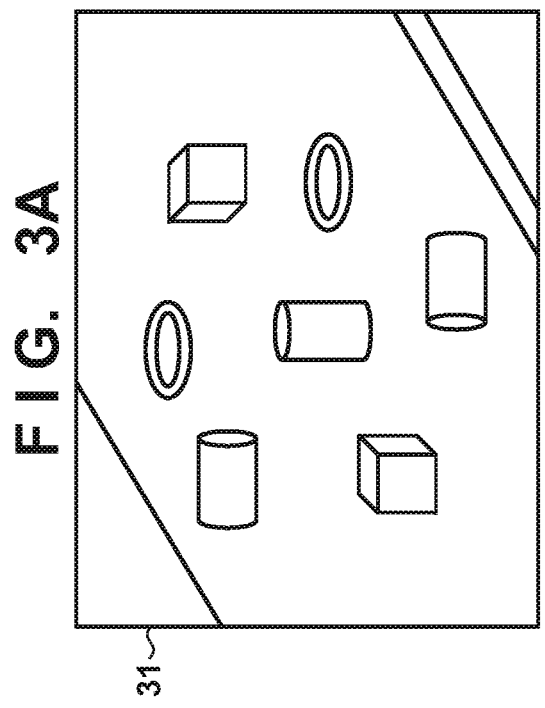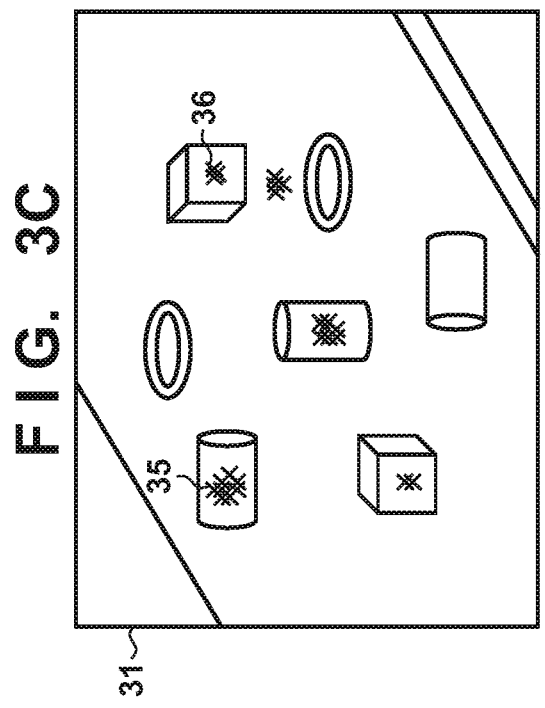

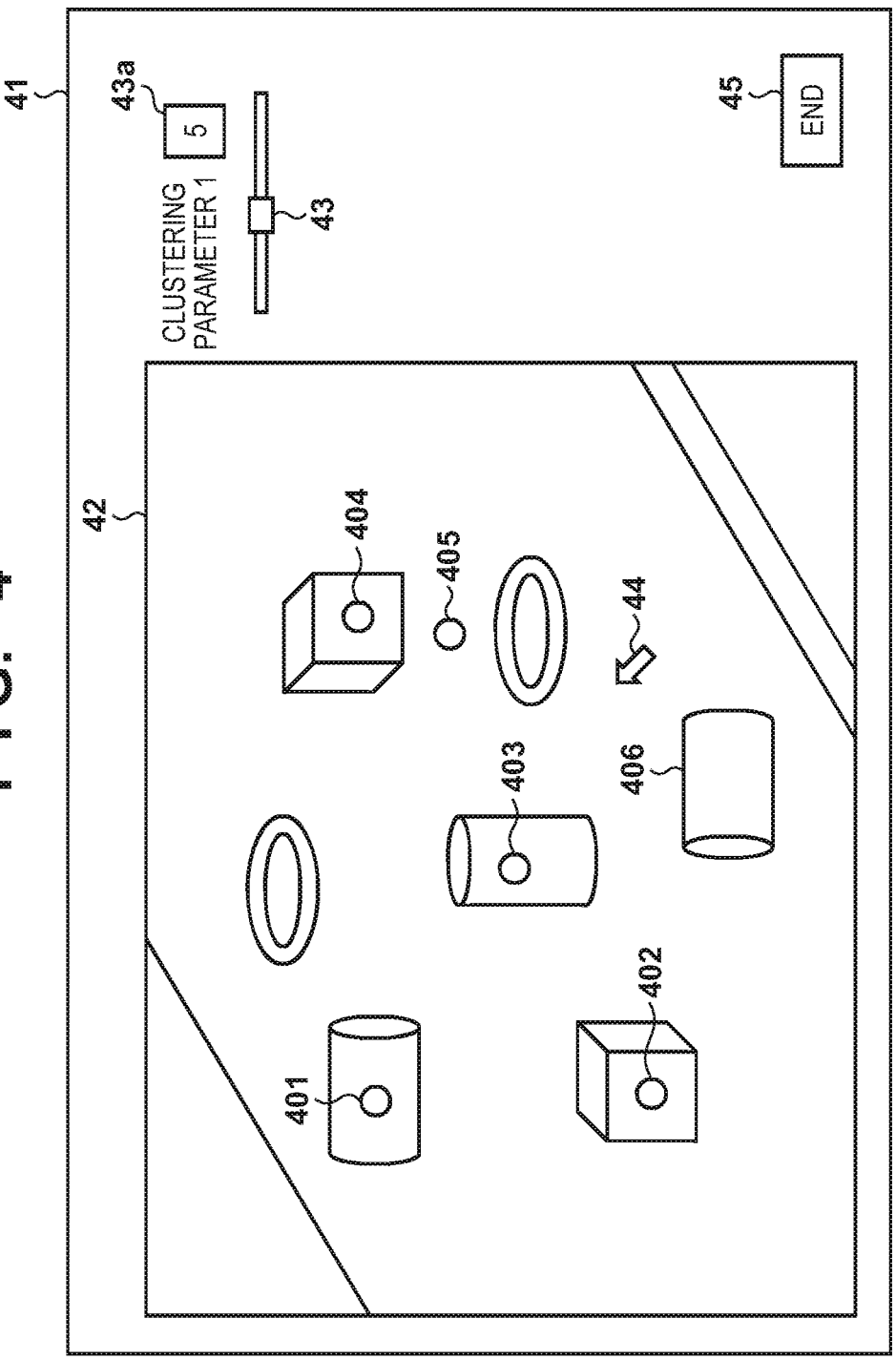

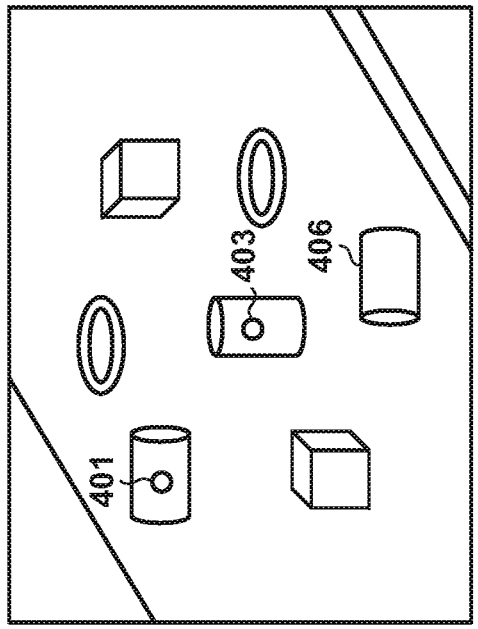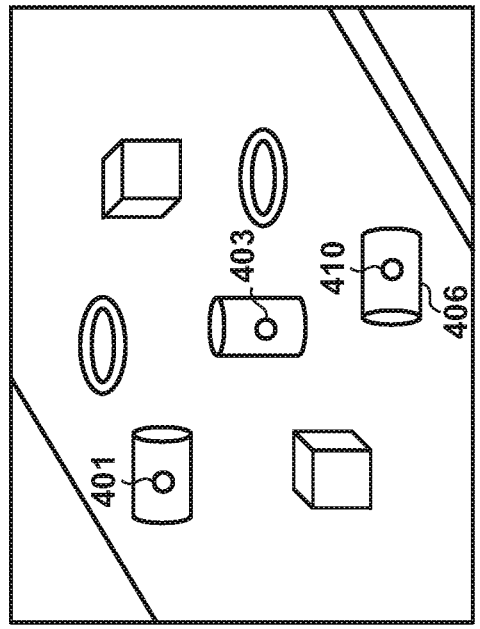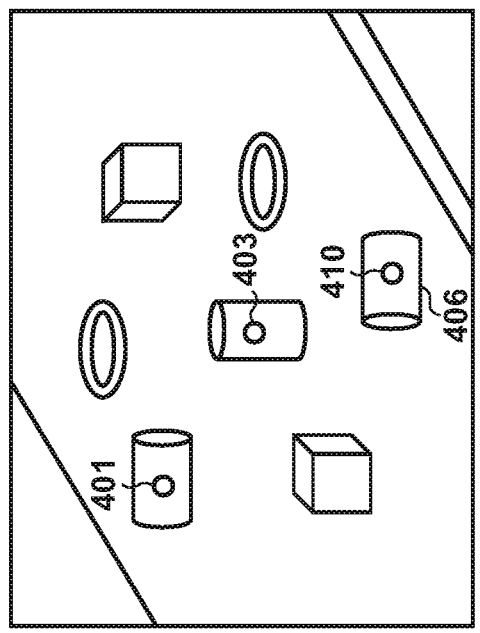

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium, particular to a technique concerning image recognition.

Description of the Related Art

There is conventionally a method of learning a feature or a pattern from a color image or a depth image obtained by capturing a target object and recognizing the target object. In such a method, to learn the feature or the pattern, a human needs to designate, in the color image or the depth image, which target object is included or designate the position or the position/orientation of the target object (to be referred to as "labeling" hereinafter). For learning, an enormous amount of such data needs to be prepared. However, it is difficult for the human to correctly perform whole labeling.

To solve this problem, there is a method of raising the accuracy of a recognizer by repeating "correction of a recognition result by a current recognizer" and "learning/update of the recognizer using the corrected data", as in Japanese Patent No. 5953151.

However, if the recognizer recognizes the position or the position/orientation of the target object, an enormous number of pixels in the image are output as a recognition result. Hence, the cost to correct each recognizer result by the human is high.

SUMMARY OF THE INVENTION

The present invention has been made in consideration of the above-described problem, and provides a technique of reducing a load on a user concerning designation of the position of a target object in an image.

According to the first aspect of the present invention, there is provided an image processing apparatus comprising: an acquisition unit configured to acquire a plurality of recognition positions each recognized by a recognizer as a position of a target object on an input image; a calculation unit configured to obtain at least one representative position by performing clustering for the plurality of recognition positions; an editing unit configured to edit the representative position in accordance with an editing instruction from a user for the representative position; and a saving unit configured to save the input image and the representative position as learning data to be used for learning of the recognizer.

According to the second aspect of the present invention, there is provided an image processing apparatus comprising: an acquisition unit configured to acquire a plurality of recognition positions/orientations each recognized by a recognizer as a position/orientation of a target object on an input image; a calculation unit configured to obtain at least one representative position/orientation by performing clustering for the plurality of recognition positions/orientations; an editing unit configured to edit the representative position/orientation in accordance with an editing instruction from a user for the representative position/orientation; and a saving unit configured to save the input image and the representative position/orientation as learning data to be used for learning of the recognizer.

According to the third aspect of the present invention, there is provided an image processing method comprising: acquiring a plurality of recognition positions each recognized by a recognizer as a position of a target object on an input image; obtaining at least one representative position by performing clustering for the plurality of recognition positions; editing the representative position in accordance with an editing instruction from a user for the representative position; and saving the input image and the representative position as learning data to be used for learning of the recognizer.

According to the fourth aspect of the present invention, there is provided an image processing method comprising: acquiring a plurality of recognition positions/orientations each recognized by a recognizer as a position/orientation of a target object on an input image; obtaining at least one representative position/orientation by performing clustering for the plurality of recognition positions/orientations; editing the representative position/orientation in accordance with an editing instruction from a user for the representative position/orientation; and saving the input image and the representative position/orientation as learning data to be used for learning of the recognizer.

According to the fifth aspect of the present invention, there is provided a non-transitory computer-readable storage medium storing a computer program configured to cause a computer to function as: an acquisition unit configured to acquire a plurality of recognition positions each recognized by a recognizer as a position of a target object on an input image; a calculation unit configured to obtain at least one representative position by performing clustering for the plurality of recognition positions; an editing unit configured to edit the representative position in accordance with an editing instruction from a user for the representative position; and a saving unit configured to save the input image and the representative position as learning data to be used for learning of the recognizer.

According to the sixth aspect of the present invention, there is provided a non-transitory computer-readable storage medium storing a computer program configured to cause a computer to function as: an acquisition unit configured to acquire a plurality of recognition positions/orientations each recognized by a recognizer as a position/orientation of a target object on an input image; a calculation unit configured to obtain at least one representative position/orientation by performing clustering for the plurality of recognition positions/orientations; an editing unit configured to edit the representative position/orientation in accordance with an editing instruction from a user for the representative position/orientation; and a saving unit configured to save the input image and the representative position/orientation as learning data to be used for learning of the recognizer.

Further features of the present invention will become apparent from the following description of exemplary embodiments (with reference to the attached drawings).

BRIEF DESCRIPTION OF THE DRAWINGS

FIGS. 2A and 2B are flowcharts of object recognition processing;

FIGS. 3A to 3D are views for explaining the processes of a recognition unit 102 and a classification unit 103;

FIG. 4 is a view showing a display example of a screen;

FIGS. 5A to 5D are views for explaining editing of a label by the user;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

An image processing apparatus according to this embodiment has a labeling function of clustering the recognition positions of a target object recognized using a recognizer for an input image and setting the representative position of the recognition positions obtained by the clustering to a label as a target to be corrected by a user. This function obviates the necessity of confirming and correcting all recognition positions by the user. Since it is only necessary to confirm and correct the label based on the representative position, the labor for labeling is reduced. Here, the label means information concerning the position or the position/orientation of the target object in the image. The label is used as supervisory data for constructing the recognizer.

Figure 1:
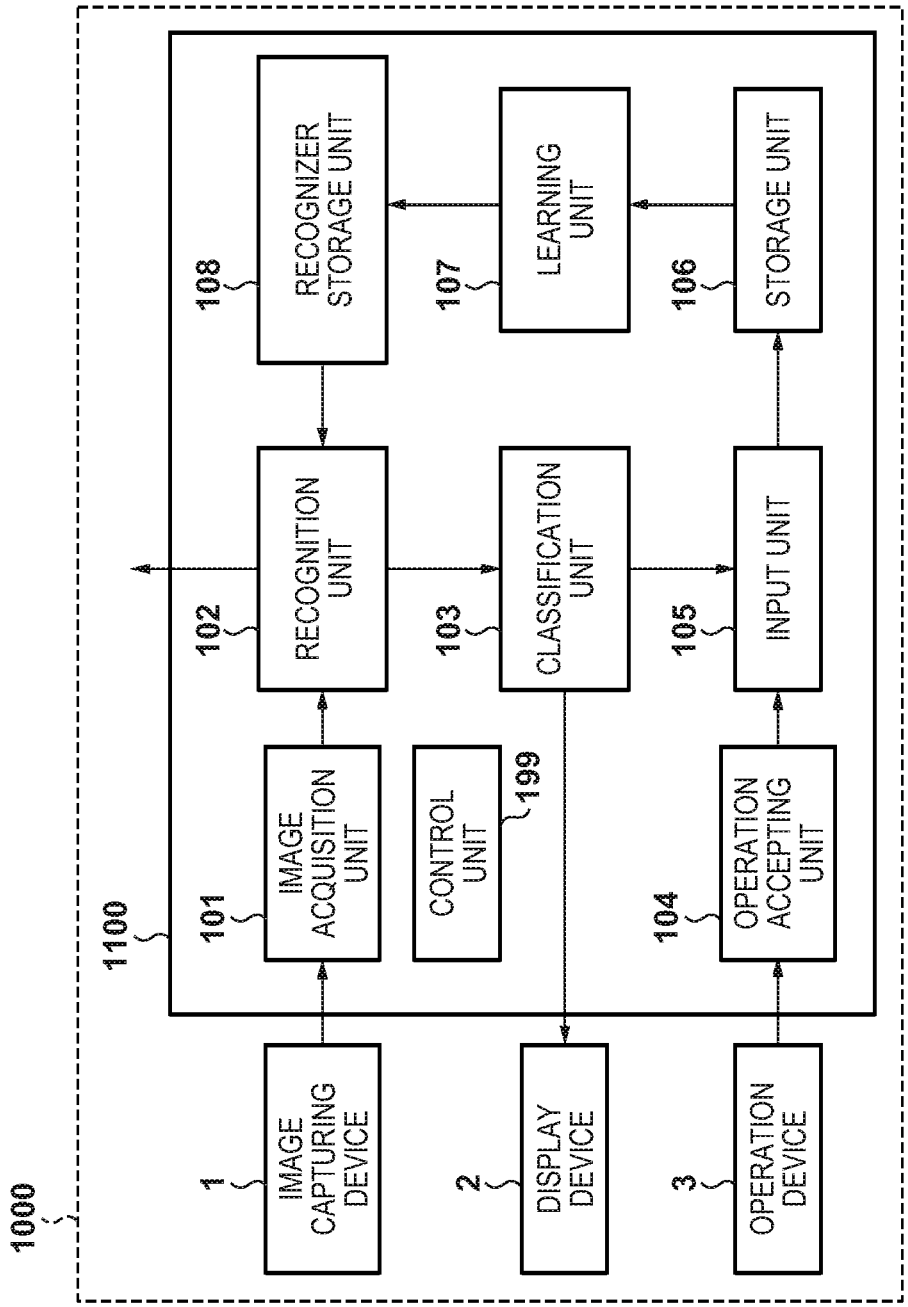
FIG. 1 is a block diagram showing an example of the functional arrangement of an object recognition apparatus.

An example of the functional arrangement of an object recognition apparatus according to this embodiment will be described first with reference to the block diagram of FIG. 1. As shown in FIG. 1, an object recognition apparatus 1000 according to this embodiment includes an image capturing device 1, a display device 2, an operation device 3, and an image processing apparatus 1100.

The image capturing device 1 will be described first. The image capturing device 1 is a device that captures a still image or a moving image. The captured image is not limited to a specific image, and can be a color image (for example, an RGB image), a monochrome image, an infrared image, or a depth image that is depth information. The image captured by the image capturing device 1 is sent to the image processing apparatus 1100.

The display device 2 will be described next. The display device 2 is formed by a CRT, a liquid crystal screen, or the like, and can display the processing result of the image processing apparatus 1100 by an image, characters, or the like. Note that the display device 2 may be a touch panel screen. In this case, the contents of various kinds of operations from the user to the touch panel screen are sent to the image processing apparatus 1100 as operation information.

The operation device 3 will be described next. The operation device 3 is formed by a user interface such as a mouse or a keyboard. When operated by the user, the operation device 3 can input various kinds of instructions to the image processing apparatus 1100. A description will be made below assuming that the operation device 3 is a mouse. However, any user interface can be applied to the operation device 3 if it is a user interface capable of inputting the same instructions as those to be described below to the image processing apparatus 1100.

The image processing apparatus 1100 will be described next. An image acquisition unit 101 acquires a captured image sent from the image capturing device 1. Note that the captured image acquisition source is not limited to the image capturing device 1. The captured image may be acquired from a device such as a database, a server apparatus, a tablet terminal device, or a smartphone via a network such as a LAN or the Internet. The captured image may be an image captured by the image capturing device 1, may be an image registered in an image database open to the public, or may be an image uploaded to the web.

A recognition unit 102 constructs a CNN (Convolutional Neural Network) (recognizer) using the model structure of the CNN and the parameters of the CNN, which are saved in a recognizer storage unit 108. The recognition unit 102 applies the constructed CNN to the captured image acquired by the image acquisition unit 101, thereby recognizing the position of a target object in the captured image as a recognition position.

A classification unit 103 performs clustering of the recognition positions recognized by the recognition unit 102, thereby classifying the recognition positions into one or more classes. The classification unit 103 then obtains (calculates) a representative position (label) corresponding to a class based on the recognition positions belonging to the class.

An operation accepting unit 104 sends, to an input unit 105, an instruction corresponding to operation contents input by the user by operating the operation device 3. The input unit 105 performs editing (labeling) of the above-described representative position based on the instruction received from the operation accepting unit 104. The input unit 105 then stores the captured image and the representative position in a storage unit 106 as learning data to be used for learning of the CNN.

A learning unit 107 creates supervisory data using the learning data stored in the storage unit 106. Then, the learning unit 107 constructs the CNN using the model structure of the CNN and the parameters of the CNN, which are saved in the recognizer storage unit 108, and performs learning processing of the parameters of the constructed CNN using the supervisory data created above. The learning unit 107 then updates the parameters of the CNN stored in the recognizer storage unit 108 to the parameters obtained by the learning processing.

The recognizer storage unit 108 holds the model structure and the parameters of the CNN. In this embodiment, the model structure of the CNN is designed as a model that receives a captured image and outputs a 2-class discrimination representing whether a target object is included in each image region of the captured image via a convolution layer, a fully connected layer, and a Softmax layer. Here, the parameters of the CNN indicate weights in the convolution layer and the fully connected layer.

A control unit 199 controls the operations of the functional units including the image acquisition unit 101, the recognition unit 102, the classification unit 103, the learning unit 107, the operation accepting unit 104, and the input unit 105, and also controls the operation of the entire image processing apparatus 1100.

Note that FIG. 1 shows the image capturing device 1, the display device 2, the operation device 3, and the image processing apparatus 1100 as separate devices. However, two or more of the devices may be integrated into one device.

Object recognition processing by the image processing apparatus 1100 will be described next with reference to the flowchart of FIG. 2A. In step S1, the control unit 199 determines whether learning of a CNN (recognizer) is necessary. A condition to determine whether learning of a CNN is necessary is not limited to a specific condition. For example, upon detecting that the user operates the operation device 3 and inputs a CNN learning instruction, the control unit 199 determines that learning of the CNN is necessary. In addition, for example, at every predetermined timing or every time a predetermined condition is satisfied, the control unit 199 determines that learning of the CNN is necessary.

If it is determined that learning of the CNN is necessary as the result of determination, the process advances to step S2. On the other hand, if it is not determined that learning of the CNN is necessary, the process advances to step S4.

In step S2, learning data is generated in the above-described way and stored in the storage unit 106. In step S3, supervisory data is created using the learning data, learning of the parameters of the CNN is performed using the supervisory data, and the parameters of the CNN stored in the recognizer storage unit 108 are updated to the parameters after the learning.

Details of the processes of steps S2 and S3 will be described with reference to the flowchart of FIG. 2B. In FIG. 2B, steps S11 to S15 are executed in step S2, and steps S16 and S17 are executed in step S3.

In step S11, the image acquisition unit 101 acquires a captured image sent from the image capturing device 1. In step S12, the recognition unit 102 first constructs a CNN using the model structure of the CNN (recognizer) and the parameters of the CNN, which are saved in the recognizer storage unit 108. The recognition unit 102 applies the constructed CNN to the captured image acquired by the image acquisition unit 101 in step S11, thereby recognizing the position of a target object in the captured image as a recognition position.

For example, if the image acquisition unit 101 acquires an image 31 shown in FIG. 3A as a captured image, the recognition unit 102 sets an image region 33 with respect to a pixel-of-interest position 32 in the image 31 as the center, as shown in FIG. 3B. The image region 33 need only include the pixel-of-interest position 32, and need not always be an image region with respect to the pixel-of-interest position 32 as the center. The recognition unit 102 inputs the image in the image region 33 to the constructed CNN and performs arithmetic processing of the CNN, thereby obtaining the output of the CNN. If the output of the CNN indicates that "the target object is included in the image region 33", the recognition unit 102 recognizes the pixel-of-interest position 32 as the position (recognition position) of the target object in the image 31. On the other hand, if the output of the CNN does not indicate that "the target object is included in the image region 33", the recognition unit 102 does not recognize the pixel-of-interest position 32 as the position (recognition position) of the target object in the image 31. The recognition unit 102 performs the same processing as described above for each pixel position while moving the pixel-of-interest position 32 in the raster scan order, as indicated by a dotted line 34, thereby determining, for each pixel position on the image 31, whether the target object is included in the image region with respect to the pixel position as the center. The position of the target object on the image 31 can thus be recognized. Note that as long as it can be determined, for each pixel position on the image 31, whether the target object is included in the image region with respect to the pixel position as the center, the moving order of the pixel-of-interest position 32 is not limited to the raster scan order.

FIG. 3C shows a result obtained when a cylindrical object of the objects included in the image 31 is set as a target object, and "×" markers (to be referred to as recognition position markers hereinafter) are added to the recognition positions of the target object on the image 31. Since similar images are extracted in the neighboring pixels, the recognition positions are often crowded densely as indicated by, for example, a recognition position marker group 35. In addition, a recognition error readily occurs for a position having a feature similar to the target object. For example, since a cube is common to a cylinder in being surrounded by edges (luminance gradients in the image), a recognition error may occur as indicated by, for example, a recognition position marker group 36.

In step S13, the classification unit 103 defines the set of the positions (recognition positions) of the target object recognized by the recognition unit 102 in step S12 as an initial set, and clustering the initial set based on a predetermined clustering condition, thereby classifying the recognition positions included in the set into one or more classes. Then, for each of the one or more classified classes, the classification unit 103 obtains a representative position corresponding to the class based on the recognition positions belonging to the class. For example, when the initial set is clustered using the K-means algorithm based on the feature of the initial set, close recognition positions are put into one class. For each class, the average position of the recognition positions belonging to the class is obtained as the representative position of the class. For example, when the positions of the recognition position marker groups shown in FIG. 3C are clustered, they are classified into five classes. FIG. 3D shows the classification result. In FIG. 3D, a "○" marker (to be referred to as a representative position marker hereinafter) is added to the position (the representative position of the class) of each of the five classified classes. A representative position marker 37 is located at the representative position of the class corresponding to the recognition position marker group 35, and a representative position marker 38 is located at the representative position of the class corresponding to the recognition position marker group 36. Note that the parameters (for example, the number of classes and the range (class range) capable of defining a class) necessary for the clustering are designated by the user in advance and held by the classification unit 103.

The classification unit 103 composites the representative position marker with the representative position of each class on the captured image (on the input image) acquired by the image acquisition unit 101 in step S1 and then displays a screen including the captured image on the display screen of the display device 2. FIG. 4 shows a display example of the screen. On a screen 41, the captured image acquired by the image acquisition unit 101 in step S1 is displayed in a display region 42. Representative position markers 401 to 405 are arranged at the representative positions of the classes on the captured image.

A slider 43 is used to set the parameters necessary for clustering. For example, when the user performs an operation of moving a cursor 44 to the position of the slider 43 and then changing the position of the slider 43 to bring the slider 43 closer to the right end by operating the operation device 3, a larger number of classes or a wider class range can be designated. Alternatively, when the user performs an operation of moving the cursor 44 to the position of the slider 43 and then changing the position of the slider 43 to bring the slider 43 closer to the left end by operating the operation device 3, a smaller number of classes or a narrower class range can be designated. The currently designated number of classes or class range is displayed as a numerical value in a region 43a. Note that the user may set the number of classes or the class range by operating the operation device 3 and thus directly designating a numerical value in the region 43a. The method of designating the number of classes or the class range is not limited to a specific designation method. Every time a parameter necessary for clustering is designated, the classification unit 103 performs clustering of the initial set using the newly designed parameter and displays, in the display region 42, the captured image in which the representative position markers are arranged at the representative positions of classes obtained by the clustering. The classification unit 103 manages the list (representative position list) of latest representative positions. Note that the screen shown in FIG. 4 is merely an example of a screen applicable to this embodiment, and the screen is not limited to this.

Next, in step S14a, the operation accepting unit 104 accepts an editing operation input (editing instruction) concerning a representative position. When the user performs the editing operation input concerning a representative position by operating the operation device 3, the operation accepting unit 104 creates an instruction for the editing and inputs it to the input unit 105.

In step S14b, upon receiving the instruction from the operation accepting unit 104, the input unit 105 performs editing processing concerning a representative position (label) classified by the classification unit 103, that is, a representative position registered in the above-described representative position list in accordance with the instruction. For example, the user performs the following operation by operating the operation device 3, thereby implementing labeling such as deletion, addition, or correction of a label.

Editing of a label by the user will be described here with reference to FIGS. 5A to 5D. All label editing processes according to user operations to be described below are performed by the input unit 105.

The user moves the cursor 44 to the position of a desired representative position marker of the representative position markers 401 to 405 and performs a right click operation by operating the operation device 3, thereby deleting the desired representative position marker. When the representative position marker is deleted, a representative position corresponding to the representative position marker is deleted from the above-described representative position list. For example, assume that the representative position markers 401 to 405 are arranged on the captured image displayed in the display region 42, as shown in FIG. 5A. The representative position markers 401 and 403 of the representative position markers 401 to 405 indicate the positions of cylindrical objects, that is, target objects. However, the representative position markers 402 and 404 indicate the positions of not cylindrical objects but cubic objects and do not indicate the positions of target objects. In addition, the representative position marker 405 does not indicate the position of an object at all. In this case, the user moves the cursor 44 to each of the positions of the representative position markers 402, 404, and 405 and performs the right click operation by operating the operation device 3, thereby deleting the representative position markers. As a result, the layout of the representative position markers changes from FIG. 5A to FIG. 5B. In FIG. 5B, the representative position markers 402, 404, and 405 of the representative position markers 401 to 405 shown in FIG. 5A are deleted. In this case, representative positions corresponding to the representative position markers 402, 404, and 405 are deleted from the above-described representative position list. As a result, only representative positions corresponding to the representative position markers 401 and 403 are registered in the representative position list.

In FIG. 5B, the representative position markers 401 and 403 are arranged on two target objects of the three target objects. However, no representative position marker is arranged on one remaining target object 406. The user moves the cursor 44 to the position of the target object 406 and performs a left click operation by operating the operation device 3, thereby arranging a new representative position marker 410 at the position, as shown in FIG. 5C. When the new representative position marker 410 is arranged, the arrangement position of the representative position marker 410 is registered as a representative position in the above-described representative position list.

In addition, the user moves the cursor 44 to the position of a desired representative position marker and performs a drag & drop operation while performing a left click operation by operating the operation device 3, thereby moving the position of the desired representative position marker. When the position of the representative position marker is moved, the position of the representative position marker is changed to the position after the movement in the above-described representative position list. FIG. 5D shows a result obtained when the user moves the position of the representative position marker 403 in FIG. 5C by operating the operation device 3.

In step S14c, the control unit 199 determines whether the user designates an end button 45 by operating the operation device 3. If the user designates the end button 45 by operating the operation device 3 as the result of determination, the process advances to step S15. On the other hand, if the user does not designate the end button 45 by operating the operation device 3, the process returns to step S14a.

In step S15, the input unit 105 stores the representative position list and the captured image acquired by the image acquisition unit 101 in step S11 in the storage unit 106 as learning data used for learning of the parameters of the CNN. In addition, if a parameter necessary for clustering is changed in the screen shown in FIG. 4, the classification unit 103 holds the changed parameter.

In step S16, the learning unit 107 creates supervisory data using the learning data stored in the storage unit 106. For example, like the recognition unit 102, the learning unit 107 sets an image region for each pixel position in the captured image included in the learning data. Then, the learning unit 107 generates, for each pixel position in the captured image, code data representing whether the pixel position corresponds to one of the representative positions registered in the representative position list included in the learning data (positive or negative (True or False)). Here, "A corresponds to B" is not limited to a case in which A totally equals B and can include a case in which the difference between A and B is not more than a predetermined value. If a pixel-of-interest position in the captured image included in the learning data corresponds to one of the representative positions registered in the representative position list included in the learning data, the learning unit 107 assigns code data "True" to the pixel-of-interest position. On the other hand, if the pixel-of-interest position in the captured image included in the learning data does not correspond to any one of the representative positions registered in the representative position list included in the learning data, the learning unit 107 assigns code data "False" to the pixel-of-interest position. The learning unit 107 thus generates supervisory data that holds, for each pixel position in the captured image, an image (training image) in the image region set for the pixel position and code data assigned to the pixel position in association with each other.

Then, the learning unit 107 constructs a CNN using the model structure of the CNN and the parameters of the CNN, which are saved in the recognizer storage unit 108. The learning unit 107 optimizes the parameters of the CNN by backpropagation that is generally used in deep learning such that the output of the CNN obtained by inputting each training image to the constructed CNN becomes code data corresponding to the training image. As the initial values of the parameters of the CNN at this time, the parameters of the CNN saved in the recognizer storage unit 108 are used.

In step S17, the learning unit 107 updates the parameters of the CNN stored in the recognizer storage unit 108 to the parameters of the CNN obtained by the learning (optimization) in step S16.

Referring back to FIG. 2A, in step S4, the image acquisition unit 101 acquires the captured image sent from the image capturing device 1. In step S5, the recognition unit 102 first constructs a CNN (recognizer) using the model structure of the CNN and the parameters of the CNN, which are saved in the recognizer storage unit 108. The recognition unit 102 then applies the constructed CNN to the captured image acquired by the image acquisition unit 101 in step S4, thereby recognizing the position of an object in the captured image as a recognition position. The output destination of the recognition position of the object recognized in step S5 is not limited to a specific output destination. For example, the captured image acquired in step S4 may be displayed in the display region 42 of the screen shown in FIG. 4 and, simultaneously, information such as a marker may be arranged at the recognition position recognized in step S5 or at a neighboring position.

As described above, according to this embodiment, when performing labeling for an image, the user can perform the labeling with reference to a representative position recognized by the current recognizer, and therefore, the labor of the user for labeling is reduced.

<Modifications of First Embodiment>

In the first embodiment, the K-means algorithm is used for clustering in step S13. However, the algorithm of clustering is not limited to a specific algorithm. For example, another clustering algorithm such as Mean Shift or Nearest Neighbor may be used, or the user may designate a region to be put into one class by dragging in the image using the mouse. This can freely adjust the region of recognition results to be processed at once.

Additionally, in the first embodiment, the average position of recognition positions belonging to a class is used as a representative position corresponding to the class in step S13. However, the representative position may be computed using another method. For example, the median of recognition positions belonging to a class may be used as the representative position of the class. Alternatively, a peak position formed by applying recognition positions belonging to a class to a Gaussian distribution may be used as the representative position of the class. This makes it possible to compute a stable representative position even if noise such as an outlier exists at a recognition position belonging to the class.

Additionally, in the first embodiment, markers indicating representative positions are arranged on the captured image in step S13. However, the pieces of information to be displayed are not limited to these pieces of information. For example, not only the markers indicating the representative positions but also markers indicating the recognition positions may be composited and displayed on the captured image. Alternatively, the positions of some target objects may be composited and displayed on the captured image. This allows the user to know what kind of recognition result is obtained by the current recognizer.

Furthermore, in the first embodiment, labeling is done by the mouse operation of the user in step S14a. However, labeling may be done by another method. For example, labeling may be executed by an operation input using a keyboard. Alternatively, labeling may be performed by an operation input using a touch panel.

Furthermore, in the first embodiment, a representative position classified by the classification unit 103 is used as an initial value, and labeling is performed for the initial value in step S14b. However, the present invention need not be limited to this. For example, the captured image with which pieces of information representing the representative positions are composited may be displayed as a screen different from the screen shown in FIG. 4 without setting an initial value, thereby causing the user to perform labeling with reference to the representative positions. Alternatively, the representative positions may be drawn on the screen shown in FIG. 4 as semitransparent markers, thereby causing the user to perform labeling with reference to the representative positions.

Second Embodiment

In the following embodiments including this embodiment and modifications, differences from the first embodiment will be described, and the rest is assumed to be the same as in the first embodiment unless it is specifically stated otherwise below. An image processing apparatus according to this embodiment has a function of computing the reliability of each class and switching whether to perform labeling by a user in accordance with the reliability, in addition to the functions of the image processing apparatus according to the first embodiment. Since the user needs to confirm and correct a label only when the reliability is low, the labor for labeling is reduced.

An example of the functional arrangement of an object recognition apparatus according to this embodiment will be described first with reference to the block diagram of FIG. 6. The same reference numerals as in FIG. 1 denote the same functional units in FIG. 6, and a description of the functional units will be omitted. In an object recognition apparatus 2000 according to this embodiment, the arrangement of an image processing apparatus 2100 is different from that of the image processing apparatus 1100 shown in FIG. 1.

A classification unit 203 has a function of generating classification information including the above-described representative position list, a set of recognition positions recognized by a recognition unit 102, and information representing which class the recognition positions are classified into and sending the classification information to a reliability computation unit 209, in addition to the function of the classification unit 103.

The reliability computation unit 209 computes, for each class, reliability according to the number of recognition positions belonging to the class. If the number of classes whose reliabilities are less than a threshold is equal to or more than a predetermined number (for example, 1), the reliability computation unit 209 determines that labeling by the user is necessary, and notifies an input unit 105 of it. Accordingly, the input unit 105 performs processing for labeling by the user, as in the first embodiment. On the other hand, if the number of classes whose reliabilities are less than the threshold is less than the predetermined number, the reliability computation unit 209 determines that labeling by the user is not necessary, and stores the representative position list and a captured image acquired by an image acquisition unit 101 in step S11 as learning data in a storage unit 106.

Figure 7:
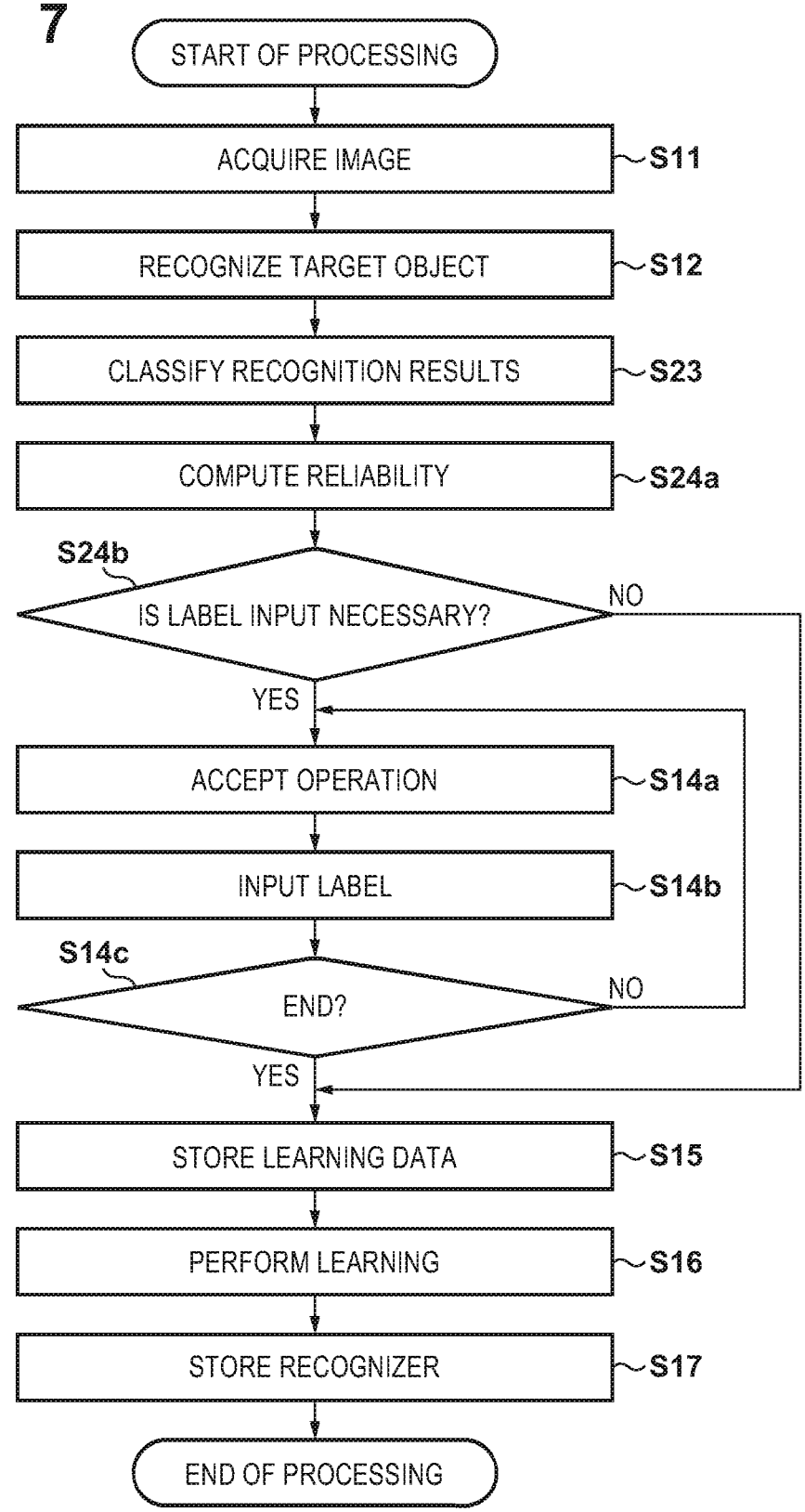
FIG. 7 is a flowchart showing details of the processes of steps S2 and S3.

Details of the processes of steps S2 and S3 according to this embodiment will be described with reference to the flowchart of FIG. 7. Note that the same step numbers as in FIG. 2B denote the same processing steps in FIG. 7, and a description of the processing steps will be omitted. In FIG. 7, steps S11 to S15 are executed in step S2, and steps S16 and S17 are executed in step S3.

In step S23, the classification unit 203 performs the process of step S13 described above, and also generates classification information including the representative position list, a set of recognition positions recognized by the recognition unit 102, and information representing which class the recognition positions are classified into and sends the classification information to the reliability computation unit 209.

In step S24a, the reliability computation unit 209 computes, for each class, reliability according to the number of recognition positions belonging to the class. The reliability of a class of interest is computed such that it becomes higher as the number of recognition positions belonging to the class of interest increases, or becomes lower as the number of recognition positions decreases. For example, the number of recognition positions belonging to the class of interest may be used as the reliability of the class of interest. For example, the reliability of a class corresponding to a representative position marker 37 shown in FIG. 3D is the number of recognition positions in a recognition position marker group 35.

For a pixel in the neighborhood of a position where a target object surely exists, an image near the target object is input. For this reason, the probability that it is determined that the target object exists is high. On the other hand, for a position that is not the target object, a recognition error occurs if a feature similar to the target object happens to be extracted. In this case, the probability that it is determined that the target object exists is low relative to the former case. For the above-described reason, it is considered that the larger the number of positions recognized as the target object is, the higher the reliability is.

In step S24b, using the number of classes whose reliabilities are less than the threshold as an index, the reliability computation unit 209 determines whether the index is equal to or larger than a predetermined number. Note that another value is also considered to be applicable as the index. For example, the ratio of "the number of classes whose reliabilities are less than the threshold" to the total number of classes may be used as the index.

If the index is equal to or larger than the predetermined number as the result of determination, it is determined that labeling by the user is necessary, and the process advances to step S14a. On the other hand, if the index is less than the predetermined number as the result of determination, the reliability computation unit 209 determines that labeling by the user is unnecessary, and the process advances to step S15. In this case, in step S15, the reliability computation unit 209 stores the representative position list and the captured image acquired by the image acquisition unit 101 in step S11 in the storage unit 106 as learning data.

As described above, according to this embodiment, when performing labeling for a new image, the user performs the labeling only when the reliability of a representative position recognized by the current recognizer is low. For this reason, the number of images that need labeling decreases, and the labor of the user for labeling is reduced.

<Modifications of Second Embodiment>

In the second embodiment, the reliability of the class of interest is computed such that it becomes higher as the number of recognition positions belonging to the class of interest increases, or becomes lower as the number of recognition positions decreases. However, the method of obtaining the reliability of the class of interest is not limited to a specific obtaining method. For example, the CNN of the recognition unit 102 is output as a probability representing whether a position corresponds to a target object. For this reason, the reliability of the class of interest may be set to be high as the sum of the outputs (probabilities) of the CNN corresponding to the recognition positions belonging to the class of interest becomes high, and the reliability of the class of interest may be set to be low as the sum becomes low. In addition, instead of using the number of recognition positions belonging to a class as the reliability of the class, the reliability may be defined as a linear sum using the probability representing whether a position corresponds to a target object as a weight, or the reliability may be defined as a linear sum using the reciprocal of the distance of each recognition position from the representative position as a weight.

Additionally, in the second embodiment, the threshold to be compared with reliability to determine whether label input (the editing operation of the representative position) by the user is necessary is a predetermined value. However, the present invention need not be limited to this. For example, the value of the threshold may be settable in accordance with a user operation on the screen shown in FIG. 4. The threshold may be set using a slider or may be set by text input. Alternatively, the threshold may be obtained by collecting the statistics on the reliability of representative positions whose labels are changed and representative positions whose labels are not changed. For example, if the average value of the reliabilities of representative positions whose labels are changed is 10, and the average value of the reliabilities of representative positions whose labels are not changed is 50, 30 that is the intermediate value between them is set as the threshold. This reduces the labor of the user for deciding the threshold.

Additionally, in the second embodiment, in a case in which label input by the user is not necessary, the reliability computation unit 209 stores the representative position list and the captured image acquired by the image acquisition unit 101 in step S11 in the storage unit 106 as learning data. However, the present invention need not be limited to this. In the case in which label input by the user is not necessary, since sufficient recognition can be performed by the current recognizer, for example, the learning data may be discarded without being stored in the storage unit 106, or the user may be allowed to determine whether to add the data as learning data. Since some processes (mainly the learning unit) are thus omitted, the series of processes can be ended more quickly.

Furthermore, in the second embodiment, in a case in which label input by the user is necessary, the input unit 105 displays all representative positions registered in the representative position list as editing candidates on the screen and accepts the editing operation. However, the present invention need not be limited to this. Since label input is not necessary for a class whose reliability is not less than the threshold, the input unit 105 may display only representative positions of classes whose reliabilities are less than the threshold as editing candidates on the screen and accept the editing operation. Conversely, if the reliability is extremely low, it can be considered as a recognition error. Hence, a threshold for a lower limit may also be provided, and the input unit 105 may display only representative positions of classes whose reliabilities are not less than the threshold of the lower limit and less than the threshold of the upper limit (the threshold used in step S24b) as editing candidates on the screen and accept the editing operation. This decreases the number of labels corrected by the user and reduces the labor of the user for labeling. In addition, information representing reliability for each representative position may be displayed on the screen shown in FIG. 4. As for the display of information representing reliability, for example, the reliability may be displayed as a text, a predetermined pattern image having a color or a shape according to the reliability may be displayed, or a pattern image created in advance for each reliability may be displayed. This provides a reference for the user to determine the degree of reliability of a representative position when performing labeling.

Third Embodiment

An image processing apparatus according to this embodiment has a function of obtaining the evaluation value of the performance of a CNN after learning and determining whether to update the CNN based on the obtained evaluation value, in addition to the functions of the image processing apparatus according to the first embodiment. When the CNN is updated only in a case in which the evaluation value becomes high, the improvement of the performance of the CNN is accelerated, a more satisfactory result can be obtained, and the amount of label correction by the user decreases. For this reason, the labor for labeling is reduced.

An example of the functional arrangement of an object recognition apparatus according to this embodiment will be described first with reference to the block diagram of FIG. 8. The same reference numerals as in FIG. 1 denote the same functional units in FIG. 8, and a description of the functional units will be omitted. In an object recognition apparatus 3000 according to this embodiment, the arrangement of an image processing apparatus 3100 is different from that of the image processing apparatus 1100 shown in FIG. 1.

A learning unit 307 sends the parameters of a CNN obtained by learning processing to an evaluation unit 310 as well, in addition to the function of the above-described learning unit 107. The evaluation unit 310 obtains the evaluation value of the performance of a CNN (old CNN) based on the model structure of the CNN and the parameters of the CNN, which are saved in a recognizer storage unit 108, using data stored in a storage unit 311. The evaluation unit 310 further obtains an evaluation value to be used to evaluate the performance of a CNN (new CNN) based on the parameters sent from the learning unit 307 and the model structure of the CNN saved in the recognizer storage unit 108 using data stored in the storage unit 311. A test image and a representative position in the test image are stored as test data in the storage unit 311.

An update determination unit 312 compares the evaluation value of the old CNN with the evaluation value of the new CNN and determines, based on the result of comparison, whether to store the parameters of the new CNN in the recognizer storage unit 108. If the evaluation value of the new CNN is higher than the evaluation value of the old CNN, the update determination unit 312 stores the parameters of the new CNN in the recognizer storage unit 108, thereby updating the old CNN held by the recognizer storage unit 108 to the new CNN.

Figure 9:
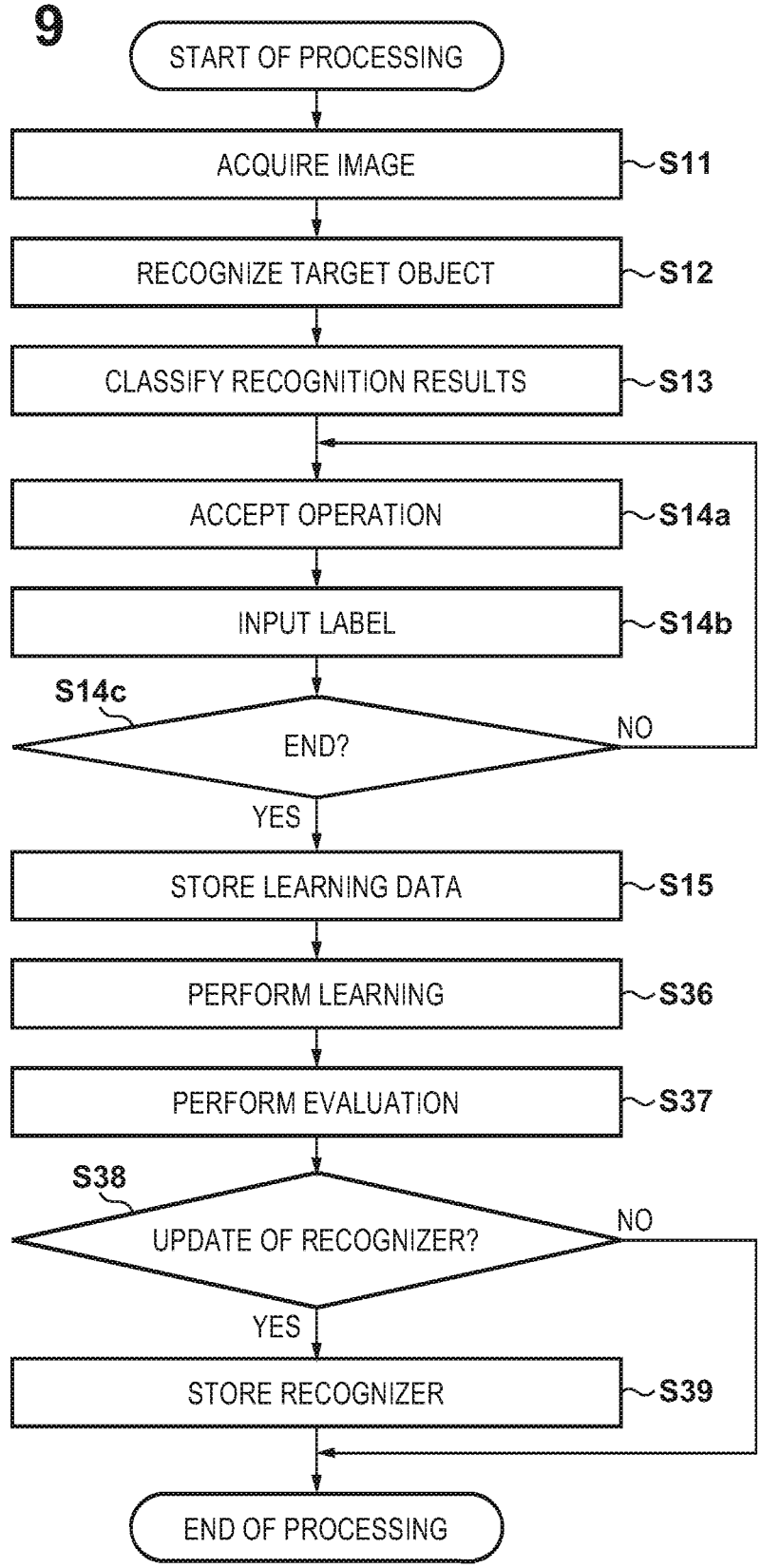
FIG. 9 is a flowchart showing details of the processes of steps S2 and S3.

Details of the processes of steps S2 and S3 according to this embodiment will be described with reference to the flowchart of FIG. 9. In FIG. 9, steps S11 to S15 are executed in step S2, and steps S36 to S39 are executed in step S3.

In step S36, the learning unit 307 performs the process of step S16 described above, and sends the parameters of a CNN obtained by the learning to the evaluation unit 310 as well.

In step S37, the evaluation unit 310 obtains the evaluation value of the old CNN and the evaluation value of the new CNN using the data stored in the storage unit 311. The method of obtaining the evaluation value of each of the old CNN and the new CNN includes various methods and is not limited to a specific method. An example of obtaining the evaluation values of the CNNs (the old CNN and the new CNN) will be described below.

First, the evaluation unit 310 acquires test data from the storage unit 311. The test data includes a plurality of sets each including a test image including one object and a representative position that is the position of the object in the test image. The evaluation unit 310 selects an unselected set of the plurality of sets included in the test data as a selected set, and applies the CNN to the test image included in the selected set, thereby acquiring a recognition position in the test image, as in step S12. If all recognition positions recognized from the test image in the selected set are located within a predetermined distance from the representative position included in the selected set, the evaluation unit 310 determines success. On the other hand, if at least one of the recognition positions recognized from the test image in the selected set is not located within the predetermined distance from the representative position included in the selected set, the evaluation unit 310 determines failure. Such success/failure determination processing for the selected set is performed for all sets included in the test data, thereby determining success/failure for each set. The evaluation unit 310 then obtains ((number of sets determined as success)/total number of sets) as an evaluation value. Such an evaluation value is obtained for each of the old CNN and the new CNN. Note that the evaluation value computation method is merely an example, as described above, and the evaluation value may be computed using another computation method.

In step S38, the update determination unit 312 compares the evaluation value of the old CNN with the evaluation value of the new CNN. If the evaluation value of the old CNN<the evaluation value of the new CNN as the result of comparison, the process advances to step S39. If the evaluation value of the old CNN≥the evaluation value of the new CNN, the processing according to the flowchart of FIG. 9 ends without updating the parameters stored in the recognizer storage unit 108. In step S39, the update determination unit 312 stores the parameters of the new CNN in the recognizer storage unit 108, thereby updating the CNN held by the recognizer storage unit 108 to the new CNN.

As described above, according to this embodiment, when performing labeling for a new image, the accuracy of a representative position presented to the user as a reference improves. Hence, the label correction amount decreases, and the labor of the user for labeling is reduced.

<Modifications of Third Embodiment>

In the third embodiment, the process of step S1 described above may be omitted. That is, since the evaluation unit 310 computes the evaluation value of the new CNN, a threshold for the evaluation value may be provided, and the learning of the CNN may repetitively be continued until the evaluation value of the new CNN becomes equal to or more than the threshold for the evaluation value. In addition, the learning may be ended when the change in the evaluation value becomes smaller than a predetermined value during the repetitive learning. For example, the learning is ended when the evaluation value changes by less than 0.01% continuously five times, and the performance is considered to be saturated. This reduces the labor of the user for determining whether learning is necessary.

Additionally, in the third embodiment, an input unit 105 always stores a captured image and a representative position in a storage unit 106. However, since not only learning data but also test data needs to be increased, sets of images and representative positions may be stored not only in the storage unit 106 but also in the storage unit 311. Note that the sets of images and representative positions may be stored in both the storage unit 106 and the storage unit 311 or may be stored in a randomly determined one of the storage unit 106 and the storage unit 311. In addition, which one of the storage unit 106 and the storage unit 311 is used to store the sets of images and representative positions may be designated by the user by operating an operation device 3.

In addition, the reliability computation unit 209 described in the second embodiment may be incorporated in the image processing apparatus 3100, and which one of the storage unit 106 and the storage unit 311 is used to store the sets of images and representative positions may be decided in accordance with the reliability computed by the reliability computation unit 209. For example, a representative position whose reliability is less than a threshold and a corresponding image are stored in the storage unit 106, and a representative position whose reliability is not less than the threshold and a corresponding image are stored in the storage unit 311. This makes it possible to efficiently collect learning data and test data.

Furthermore, in step S38, not only determining whether to update the CNN but also determining whether to hold newly registered learning data (to be referred to as new learning data hereinafter) may be performed. Since the deterioration of performance indicates that an error is included in the label of the new learning data at a high possibility, the new learning data may be discarded. Alternatively, to confirm whether the label of the new learning data is really correct, the user may be requested to input the label again. This can reduce the frequency to store learning data including a label error.

Additionally, in the third embodiment, two CNNs, that is, the old CNN and the new CNN are evaluated. However, the present invention need not be limited to this. A plurality of old CNNs may exist, and a plurality of new CNNs may exist. In this case, for example, as for the old CNN, top three CNNs of high evaluation values of the old CNNs and the new CNNs are stored in the recognizer storage unit 108. In addition, for example, for the new CNN, a plurality of learning results are obtained by setting a random value or one of the old CNNs as the initial value or selecting learning data at random.

Fourth Embodiment

In the above-described embodiments and modifications, learning is performed every time learning data is newly added. However, the present invention need not be limited to this. For example, learning may be performed after a plurality of sets (sets of images and representative positions) are collected, or the user may designate the timing to do learning by operating an operation device 3.

Additionally, in the above-described embodiments and modifications, a recognizer is constructed by learning the CNN that is a kind of deep learning. However, the present invention need not be limited to this. As a feature, LBP (Local Binary Pattern) may be used, or BoF (Bag of Features) may be used. As the discriminator, a decision tree may be used, or SVM (Support Vector Machine) or the like may be used.

Figure 10C:
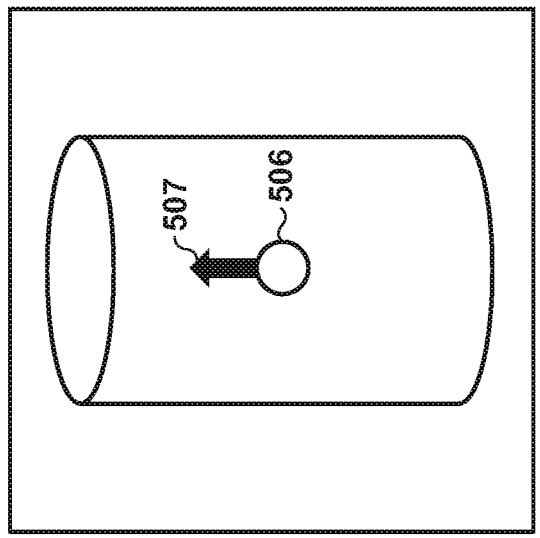
FIGS. 10A to 10C are views for explaining processing executed in a case in which not only a position but also orientation is recognized.

Additionally, in the above-described embodiments and modifications, only the position of a target object in the image is recognized. However, the present invention need not be limited to this. For example, the output of the CNN is not limited to 2-class discrimination for determining whether a position corresponds to a target object, and an output may be added to classify the orientation as well, thereby recognizing the position/orientation of the target object in the image. Processing of recognizing not only the position but also the orientation will be described below with reference to FIGS. 10A to 10C.

Figure 10B:
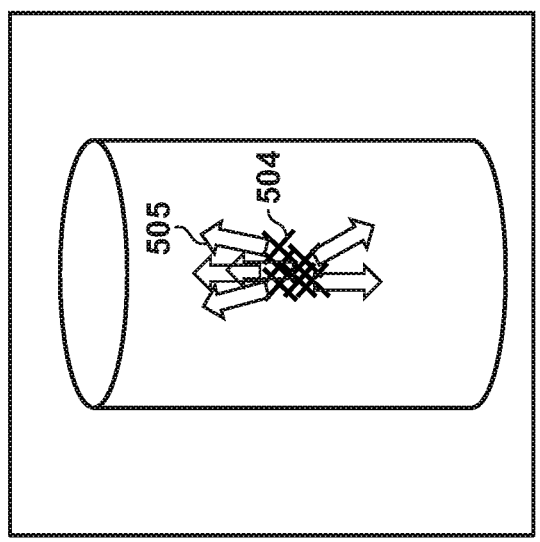
Figure 10A:
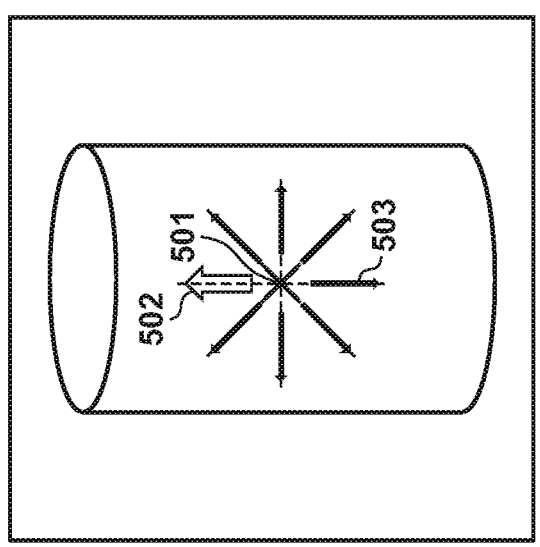

A x marker 501 shown in FIG. 10A indicates a position (x, y) in the image of a target object to be recognized, an outlined arrow 502 indicates an orientation θ of the target object to be recognized in the image, and black arrows 503 indicate directions in which the orientation of the target object is quantized into eight orientations. A label is set as the position/orientation (x, y, θ) of the target object, as shown in FIG. 10A, and the CNN is designed to perform 9-class discrimination to discriminate "which one of the eight orientations the target object has" + "the position does not correspond to the target object".

When such a CNN is created, and recognition is performed as in step S12 of the first embodiment, a plurality of position/orientation recognition results (recognized positions/orientations) are obtained, as shown in FIG. 10B. A x marker group 504 shown in FIG. 10B represents the recognized position group of the object, and a group of outlined arrows 505 represents the recognized orientation group.

Clustering of the recognition results is performed as in step S13 of the first embodiment, thereby obtaining a representative position/orientation and presenting it to the user. When obtaining the representative position/orientation, the position/orientation (x, y, θ) of each target object may be defined as a feature, and clustering may be performed using the K-means algorithm. Alternatively, after clustering the position (x, y), clustering of the orientations θ in the class may be performed. A representative position/orientation indicated by a ○ marker 506 (representing a representative position) in FIG. 10C and a black arrow 507 (representing a representative orientation) can thus be obtained.

An input unit 105 can edit not only a position but also an orientation. To correct the orientation, for example, a direction vector from the position of the target object to the position of the cursor of the mouse is set. Alternatively, the orientation may be decided after the position of the target object is decided, or a position editing mode and an orientation editing mode may be switched.

Note that a case of a position/orientation in a two-dimensional image has been described above. However, even if the number of dimensions is increased to recognize, for example, positions/orientations in a three-dimensional space, the same processing as described above can be performed by setting the label to (x, y, z, θ, φ, ψ) (θ, φ, and ψ are angles about the x-, y-, and z-axes, respectively).

Fifth Embodiment

Figure 6:
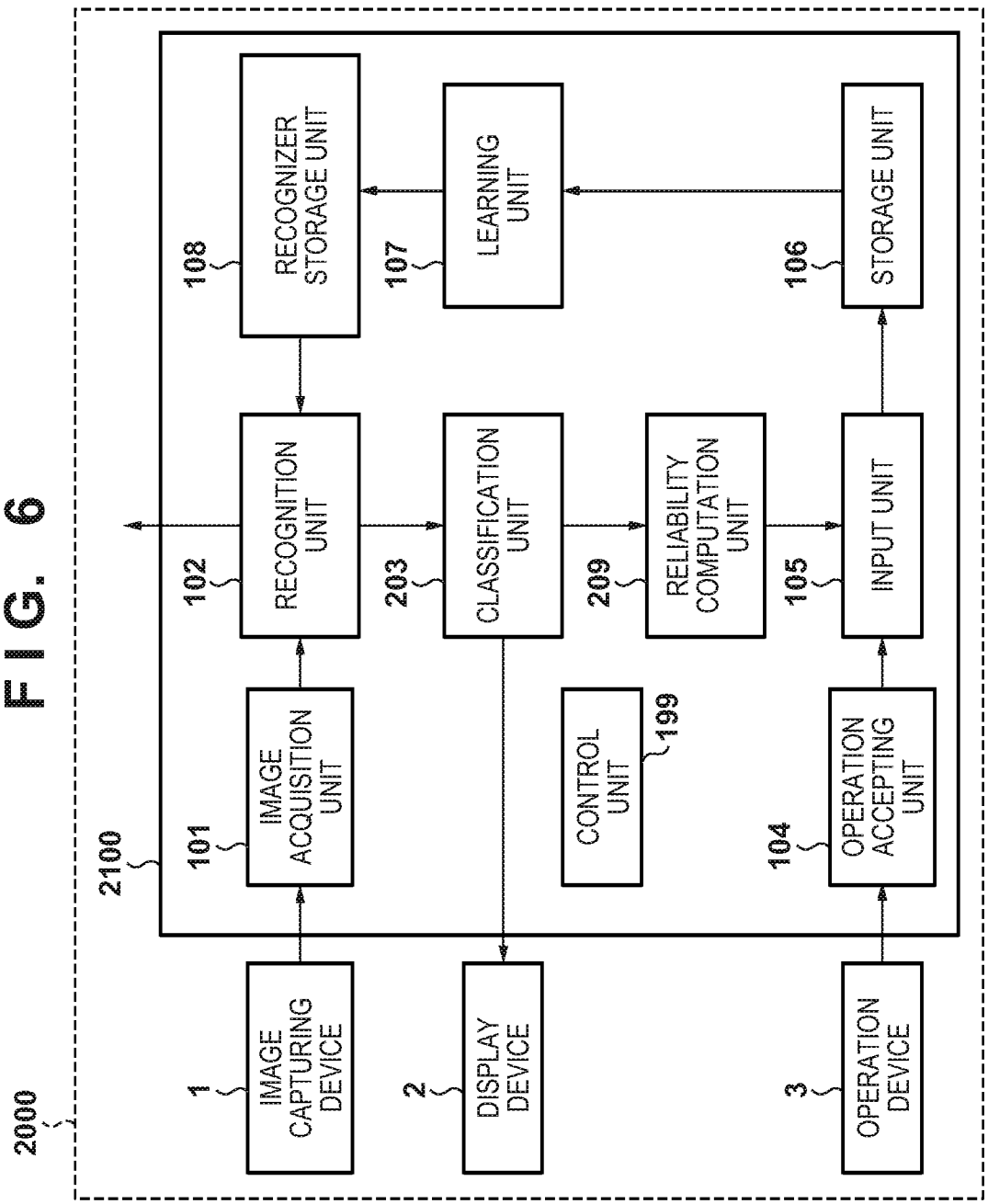
FIG. 6 is a block diagram showing an example of the functional arrangement of an object recognition apparatus.
Figure 8:
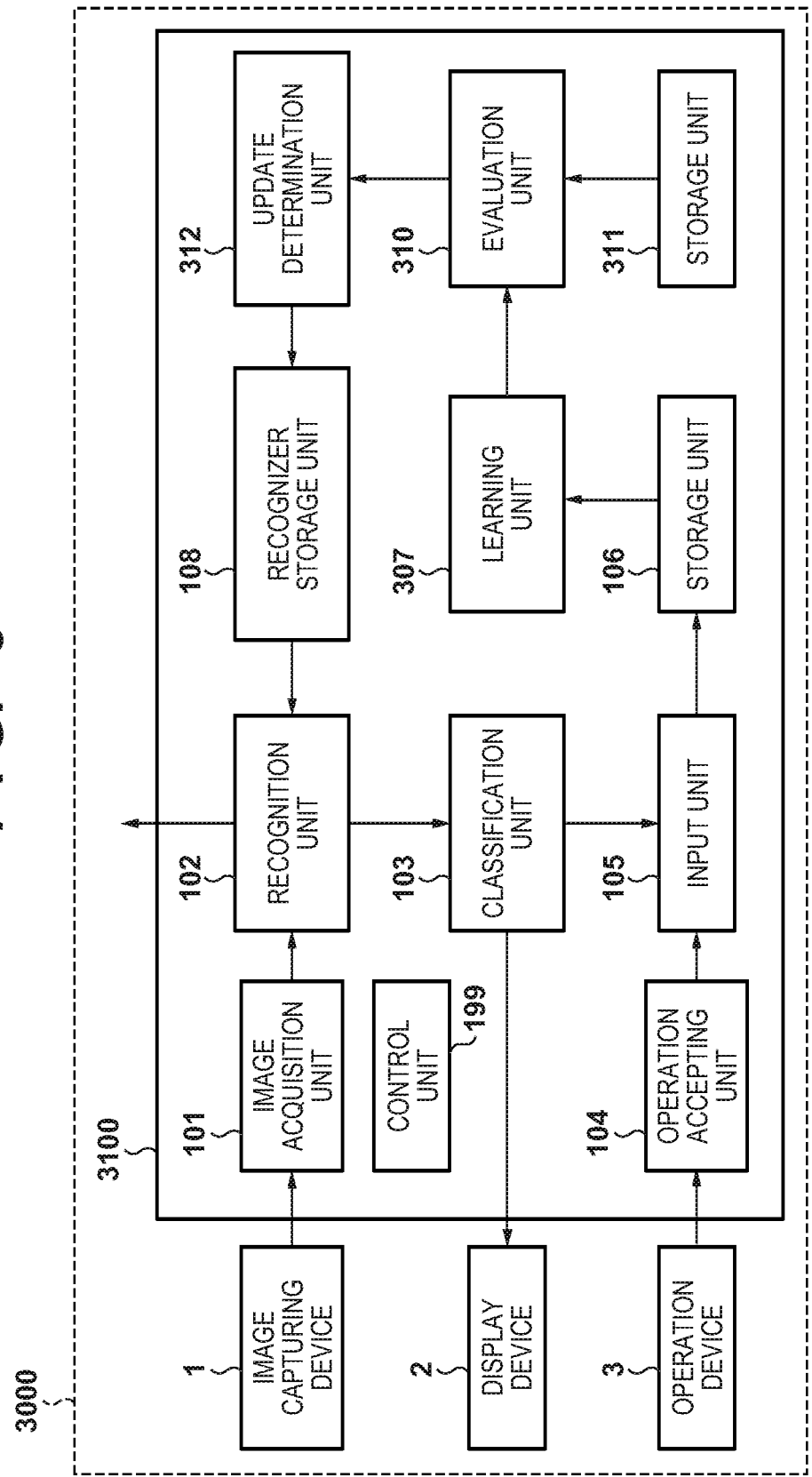
FIG. 8 is a block diagram showing an example of the functional arrangement of an object recognition apparatus.
Figure 11:
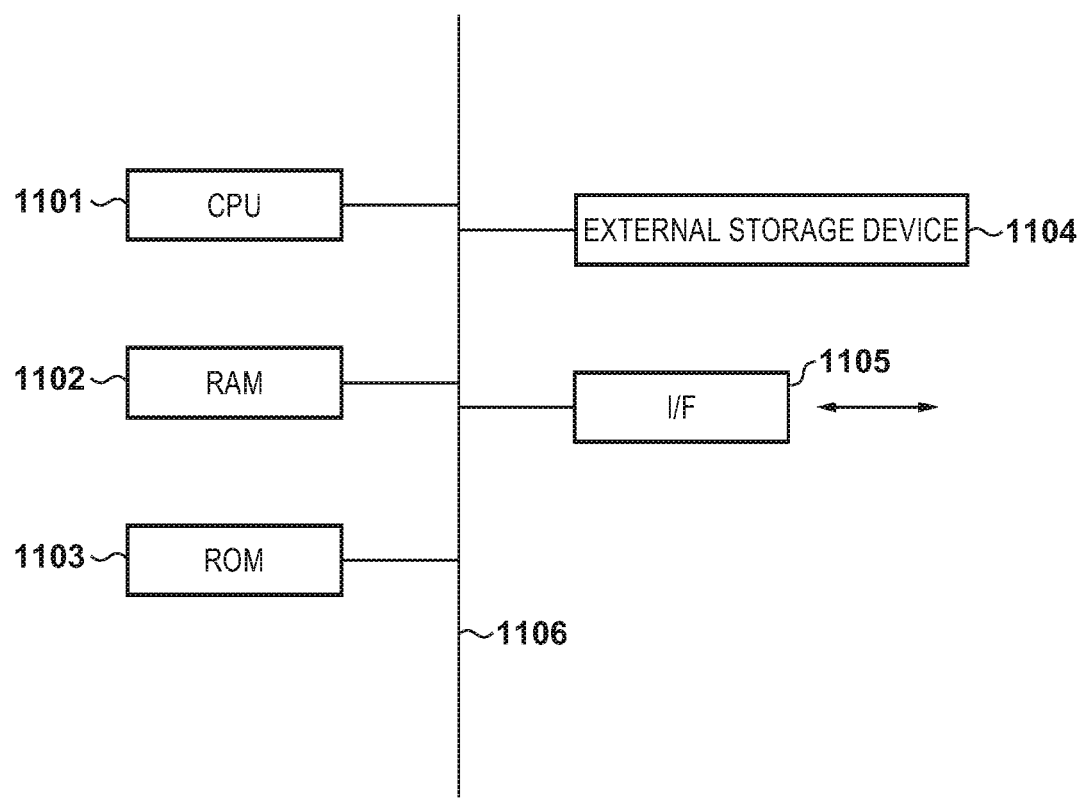
FIG. 11 is a block diagram showing an example of the hardware arrangement of a computer apparatus.

The functional units of the image processing apparatuses 1100, 2100, and 3100 shown in FIGS. 1, 6, and 8 may be implemented by hardware. However, some of the functional units may be implemented by software (computer program). In the latter case, a computer apparatus capable of executing a computer program for implementing the functions of the functional units other than the storage unit 106, the recognizer storage unit 108, and the storage unit 311 can be applied to the image processing apparatuses 1100, 2100, and 3100. An example of the hardware arrangement of the computer apparatus applicable to the image processing apparatuses 1100, 2100, and 3100 will be described with reference to the block diagram of FIG. 11.

A CPU 1101 executes processing using computer programs and data stored in a RAM 1102 and a ROM 1103. The CPU 1101 thus controls the operation of the entire computer apparatus, and also executes or controls each of the processes explained above as processes to be executed by each of the image processing apparatuses 1100, 2100, and 3100.

The RAM 1102 has an area to store a captured image acquired from an image capturing device 1 via an I/F (interface) 1105, or a computer program or data loaded from the ROM 1103 or an external storage device 1104. In addition, the RAM 1102 has a work area to be used by the CPU 1101 to execute various kinds of processes. The RAM 1102 can thus provide various kinds of areas as needed. The ROM 1103 stores computer programs and data which do not need rewrite, for example, the computer program and data of the BIOS.

The external storage device 1104 is a mass information storage device represented by a hard disk drive. An OS (Operating System) or computer programs and data configured to cause the CPU 1101 to execute or control each of the processes explained above as processes to be executed by the image processing apparatuses 1100, 2100, and 3100 are saved in the external storage device 1104. The computer programs stored in the external storage device 1104 include a computer program configured to cause the CPU 1101 to execute the functions of the functional units other than the storage unit 106, the recognizer storage unit 108, and the storage unit 311 in FIGS. 1, 6, and 8. In addition, the data saved in the external storage device 1104 includes data explained as known information in the above description. The computer program or data saved in the external storage device 1104 is loaded to the RAM 1102 as needed under the control of the CPU 1101 and processed by the CPU 1101. Note that the storage unit 106, the recognizer storage unit 108, and the storage unit 311 described above can be implemented using the RAM 1102 or the external storage device 1104. Note that various memory devices such as a USB memory or a SD card can be applied to the external storage device 1104.

The I/F 1105 is formed by an interface group to connect the image capturing device 1, the display device 2, and the operation device 3 described above. All the CPU 1101, the RAM 1102, the ROM 1103, the external storage device 1104, and the I/F 1105 are connected to a bus 1106.

Note that some or all of the above-described embodiments and modifications may be appropriately combined and used.

In addition, some or all of the above-described embodiments and modifications may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-157618, filed Aug. 17, 2017, which is hereby incorporated by reference herein in its entirety.

What is claimed is:

1. An image processing apparatus comprising:
an acquisition unit configured to acquire a plurality of recognition positions each recognized by a recognizer as a position of a target object on an input image;
a calculation unit configured to obtain at least one representative position by performing clustering for the plurality of recognition positions;
an editing unit configured to edit the representative position in accordance with an editing instruction from a user for the representative position; and
a saving unit configured to save the input image and the representative position as learning data to be used for learning of the recognizer.

2. The apparatus according to claim 1, wherein the acquisition unit acquires, as the plurality of recognition positions, a plurality of pixel positions each recognized by the recognizer as the position of the target object in pixel positions on the input image.

3. The apparatus according to claim 1, wherein when an output from the recognizer to which an image in an image region including a pixel position on the input image is input represents that the target object is included in the image region, the acquisition unit acquires the pixel position as the recognition position.

4. The apparatus according to claim 1, wherein the calculation unit classifies the plurality of recognition positions into a predetermined number of classes by performing clustering for the plurality of recognition positions, and obtains a representative position corresponding to each class based on recognition positions belonging to the class.

5. The apparatus according to claim 4, wherein the calculation unit obtains, as the representative position corresponding to the class, an average position of the recognition positions belonging to the class, a median of the recognition positions belonging to the class, or a peak position formed by applying the recognition positions belonging to the class to a Gaussian distribution.

6. The apparatus according to claim 4, further comprising a computation unit configured to obtain a reliability for the class,
wherein the editing unit operates when the number of classes whose reliabilities are less than a threshold becomes not less than a predetermined number or when a ratio of the number of classes whose reliabilities are less than the threshold to the total number of classes becomes not less than a predetermined number.

7. The apparatus according to claim 6, wherein the computation unit obtains the reliability for the class in accordance with the number of recognition positions belonging to the class.

8. The apparatus according to claim 6, wherein the computation unit obtains the reliability for the class in accordance with an output of the recognizer corresponding to a recognition position belonging to the class.

9. The apparatus according to claim 6, wherein the computation unit obtains the reliability for the class in accordance with a distance between a recognition position belonging to the class and a representative position corresponding to the class.

10. The apparatus according to claim 1, wherein the editing unit displays information representing the representative position, which is superimposed on the input image, and accepts an editing operation from the user for the representative position.

11. The apparatus according to claim 6, wherein the editing unit displays information representing a representative position of a class whose reliability is not less than a threshold, which is superimposed on the input image, and accepts an editing operation from the user for the representative position.

12. The apparatus according to claim 1, wherein the editing unit moves the representative position in accordance with a moving instruction from the user for the representative position, deletes the representative position in accordance with a deletion instruction from the user for the representative position, and adds a representative position in accordance with an instruction from the user to add a new representative position.

13. The apparatus according to claim 1, further comprising a learning unit configured to perform the learning of the recognizer using the learning data saved by the saving unit.

14. The apparatus according to claim 13, further comprising an updating unit configured to update the recognizer to the recognizer that has undergone the learning.

15. The apparatus according to claim 14, wherein when an evaluation value for the recognizer before the learning is higher than an evaluation value for the recognizer after the learning, the updating unit updates the recognizer before the learning to the recognizer after the learning.

16. An image processing apparatus comprising:
an acquisition unit configured to acquire a plurality of recognition positions/orientations each recognized by a recognizer as a position/orientation of a target object on an input image;
a calculation unit configured to obtain at least one representative position/orientation by performing clustering for the plurality of recognition positions/orientations;
an editing unit configured to edit the representative position/orientation in accordance with an editing instruction from a user for the representative position/orientation; and
a saving unit configured to save the input image and the representative position/orientation as learning data to be used for learning of the recognizer.

17. An image processing method comprising:
acquiring a plurality of recognition positions each recognized by a recognizer as a position of a target object on an input image;
obtaining at least one representative position by performing clustering for the plurality of recognition positions;
editing the representative position in accordance with an editing instruction from a user for the representative position; and
saving the input image and the representative position as learning data to be used for learning of the recognizer.

18. An image processing method comprising:
acquiring a plurality of recognition positions/orientations each recognized by a recognizer as a position/orientation of a target object on an input image;
obtaining at least one representative position/orientation by performing clustering for the plurality of recognition positions/orientations;
editing the representative position/orientation in accordance with an editing instruction from a user for the representative position/orientation; and
saving the input image and the representative position/orientation as learning data to be used for learning of the recognizer.

19. A non-transitory computer-readable storage medium storing a computer program configured to cause a computer to function as:
an acquisition unit configured to acquire a plurality of recognition positions each recognized by a recognizer as a position of a target object on an input image;
a calculation unit configured to obtain at least one representative position by performing clustering for the plurality of recognition positions;
an editing unit configured to edit the representative position in accordance with an editing instruction from a user for the representative position; and
a saving unit configured to save the input image and the representative position as learning data to be used for learning of the recognizer.

20. A non-transitory computer-readable storage medium storing a computer program configured to cause a computer to function as:
an acquisition unit configured to acquire a plurality of recognition positions/orientations each recognized by a recognizer as a position/orientation of a target object on an input image;
a calculation unit configured to obtain at least one representative position/orientation by performing clustering for the plurality of recognition positions/orientations;

an editing unit configured to edit the representative position/orientation in accordance with an editing instruction from a user for the representative position/orientation; and a saving unit configured to save the input image and the representative position/orientation as learning data to be used for learning of the recognizer.

* * * * *